US012619854B2

(12) United States Patent
El-Kurdi et al.

(10) Patent No.: US 12,619,854 B2
(45) Date of Patent: May 5, 2026

(54) NEURAL NETWORK INFERENCE QUANTIZATION

(71) Applicant: International Business Machines Corporation, Armonk, NY (US)

(72) Inventors: Yousef El-Kurdi, Mahopac, NY (US); Jerome L Quinn, Westchester, NY (US); Robert Todd Ward, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 17/652,102

(22) Filed: Feb. 23, 2022

(65) Prior Publication Data

US 2023/0267301 A1 Aug. 24, 2023

(51) Int. Cl.
| | |
|---|---|
| *G06N 3/04* | (2023.01) |
| *G06F 17/16* | (2006.01) |
| *G06N 3/0495* | (2023.01) |
| *G06N 3/10* | (2006.01) |

(52) U.S. Cl.
CPC .............. *G06N 3/04* (2013.01); *G06F 17/16* (2013.01); *G06N 3/0495* (2023.01); *G06N 3/10* (2013.01)

(58) Field of Classification Search
CPC ........... G06N 3/04; G06N 3/10; G06N 3/045; G06N 3/048; G06N 3/0495; G06N 3/08; G06F 17/16
See application file for complete search history.

(56) References Cited

U.S. PATENT DOCUMENTS

| | | |
|---|---|---|
| 2019/0156853 A1 | 5/2019 | Komatsu |
| 2021/0064983 A1 | 3/2021 | Mai |
| 2021/0110269 A1 | 4/2021 | Sameh |

FOREIGN PATENT DOCUMENTS

| | | |
|---|---|---|
| WO | 2021058578 A1 | 4/2021 |
| WO | 2021146635 A1 | 7/2021 |
| WO | 2021213247 A1 | 10/2021 |
| WO | 2023/160406 A1 | 8/2023 |

OTHER PUBLICATIONS

Kumar, Raja. "Hybrid and Non-Uniform quantization methods using retro synthesis data for efficient inference." arXiv preprint arXiv: 2012.13716 (2020). (Year: 2020).*

(Continued)

*Primary Examiner* — Jennifer N Welch
*Assistant Examiner* — Megan Elizabeth Hwang
(74) *Attorney, Agent, or Firm* — Harrity & Harrity, LLP

(57) ABSTRACT

One or more computer processors responsive to neural network run-time, reduce one or more sets of maximum activations along a hidden dimension respectively associated with one or more activation tensors and one or more layers of a neural network. The one or more computer processors compute an interquartile range (IQR) clip threshold for each reduced set for each sequence dimension in the neural network. The one or more computer processors clip one or more activations based on respective computed IQR clip thresholds. The one or more computer processors quantize the clipped activations.

11 Claims, 6 Drawing Sheets

(56)　　　　　　　References Cited

OTHER PUBLICATIONS

Zhao, Ritchie, et al. "Improving neural network quantization without retraining using outlier channel splitting." International conference on machine learning. PMLR, 2019. (Year: 2019).*

Alshammari, Hamoud, et al. "Non-negative matrix factorization (NMF) for outlier detection in wireless sensor networks." 2018 14th International Wireless Communications & Mobile Computing Conference (IWCMC). IEEE, 2018. (Year: 2018).*

Tung, Frederick, and Greg Mori. "Clip-q: Deep network compression learning by in-parallel pruning-quantization." Proceedings of the IEEE conference on computer vision and pattern recognition. 2018. (Year: 2018).*

Zhao, Ritchie, et al. "OverQ: Opportunistic Outlier Quantization for Neural Network Accelerators." arXiv preprint arXiv:1910.06909 (2019). (Year: 2019).*

Nagel, Markus, et al. "A white paper on neural network quantization." arXiv preprint arXiv:2106.08295 (2021). (Year: 2021).*

Tambe, Thierry, et al. "Algorithm-hardware co-design of adaptive floating-point encodings for resilient deep learning inference." 2020 57th ACM/IEEE Design Automation Conference (DAC). IEEE, 2020. (Year: 2020).*

"NVIDIA TensorRT", NVIDIA Developer, Copyright © 2022, 6 pages, <https://developer.nvidia.com/tensorrt>.

"Quantization", PyTorch 1.10.1 documentation, Downloaded Jan. 24, 2022, 9 pages, <https://pytorch.org/docs/stable/quantization.html>.

Bai et al., "Towards Efficient Post-training Quantization of Pre-trained Language Models," arXiv preprint arXiv:2109.15082, 2021, 12 pages.

El-Kurdi et al., "Zero-Shot Dynamic Quantization for Transformer Inference", Downloaded Jan. 24, 2022, 7 pages.

Kumar, Raja, "Hybrid and Non-Uniform Quantization Methods Using Retro Synthesis Data for Efficient Inference," arXiv preprint arXiv:2012.13716, 2020, 12 pages.

Li, Yufeng, "Faster and smaller quantized NLP with Hugging Face and ONNX Runtime", Aug. 31, 2020, 8 pages, <https://medium.com/microsoftazure/faster-and-smaller-quantized-nlp-with-hugging-face-and-onnx-runtime-ec5525473bb7>.

Mckinstry et al., "Discovering Low-Precision Networks Close to Full-Precision Networks for Efficient Embed-Ded Inference", arXiv:1809.04191v2 [cs.CV] Feb. 25, 2019, 11 pages.

Wu et al., "Integer Quantization for Deep Learning Inference: Principles and Empirical Evaluation", arXiv:2004.09602v1 [cs.LG] Apr. 20, 2020, 20 pages.

Zafrir et al., "Q8BERT: Quantized 8Bit BERT", arXiv:1910.06188 [cs.CL], Oct. 17, 2019, 5 pages.

International Search Report and Written Opinion for Application No. PCT/CN2023/075330, dated Apr. 23, 2023, 7 pages.

* cited by examiner

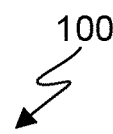
100
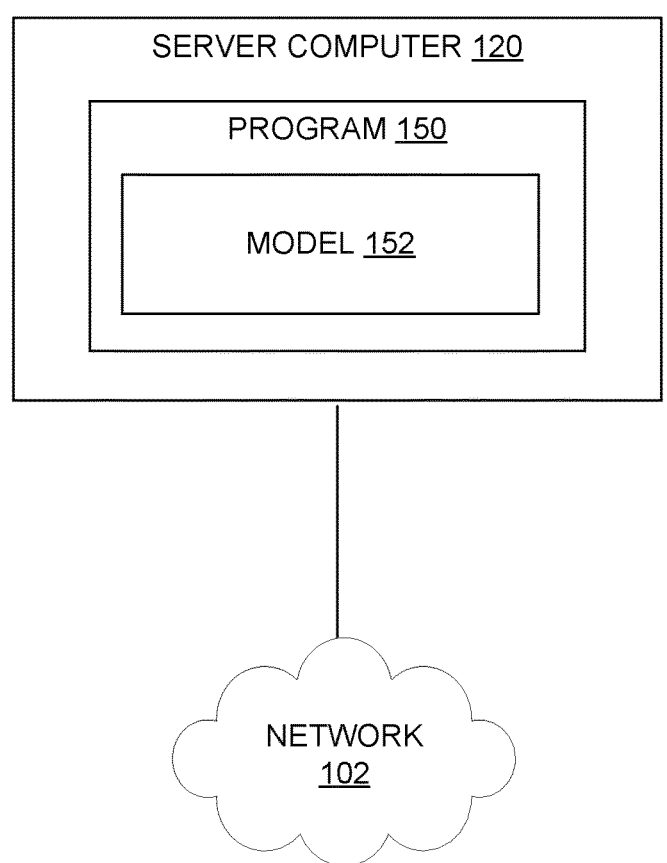
FIG. 1

300

---
Algorithm 2 Activation clipping using TM-IQR
---

Input: Activation tensor $\mathcal{A} \in \mathbb{R}^{L \times H}$
$\mathcal{L} \leftarrow \{1, 2, \ldots, L\}$
$\mathcal{H} \leftarrow \{1, 2, \ldots, H\}$
1: $M(i) \leftarrow \max_{\forall j \in \mathcal{H}} |\mathcal{A}(i,j)|, \forall i \in \mathcal{L}$
2: $M \leftarrow \text{sort}(M)$
3: $q1 \leftarrow \text{first-quartile}(M)$
4: $q3 \leftarrow \text{third-quartile}(M)$
5: $t \leftarrow q3 + 1.5(q3 - q1)$
6: $\mathcal{A}(i,j) \leftarrow \min(\mathcal{A}(i,j), t), \quad \forall (i,j) \in \mathcal{L} \times \mathcal{H}$
7: $\mathcal{A}(i,j) \leftarrow \max(\mathcal{A}(i,j), -t), \forall (i,j) \in \mathcal{L} \times \mathcal{H}$
Return: $\mathcal{A}$

| Task | FP32 | I8 | TM-IQR |
|------|------|-----|--------|
| BERT-base-cased | | | |
| MNLI | 83.7 (0.2) | 82.3 (0.5) | 83.5 (0.3) |
| MNLI-MM | 84.1 (0.1) | 82.9 (0.2) | 83.8 (0.2) |
| CoLA | 58.0 (1.4) | 48.3 (0.9) | 57.7 (1.6) |
| SST-2 | 82.3 (0.3) | 92.1 (0.2) | 92 (0.4) |
| MRPC | 88.5 (1.2) | 88.8 (1.6) | 88.5 (1.5) |
| STS-B | 88.3 (0.8) | 87.7 (0.8) | 88.1 (0.8) |
| QQP | 87.4 (0.1) | 86.2 (0.3) | 87.2 (0.2) |
| QNLI | 90.8 (0.2) | 90.3 (0.1) | 90.5 (0.2) |
| RTE | 64.6 (1.0) | 63.9 (1.0) | 64.9 (1.6) |
| Average | 82 | 80.3 | 81.8 |
| BERT-large-cased | | | |
| MNLI | 86.4 (0.1) | 86 (0.2) | 86 (0.1) |
| MNLI-MM | 86.5 (0.2) | 86.3 (0.1) | 86 (0.1) |
| CoLA | 62.9 (0.8) | 60.6 (1.5) | 62.1 (1.2) |
| SST-2 | 93.3 (0.5) | 92.8 (0.7) | 92.9 (0.4) |
| MRPC | 90.5 (0.5) | 89.6 (0.9) | 90.5 (0.7) |
| STS-B | 89.6 (0.6) | 87.4 (1.2) | 89.1 (0.3) |
| QQP | 83.3 (0.2) | 88.1 (0.1) | 88.1 (0.1) |
| QNLI | 92.4 (0.1) | 91.9 (0.1) | 92.2 (0.2) |
| RTE | 69.8 (1.4) | 64 (2) | 68.5 (1.7) |
| Average | 84.4 | 83 | 84 |

500

| Task | FP32 | I8 | TM-IQR |
|---|---|---|---|
| XLM-R-base TyDI | 67.7 | 62.9 | 67 |
| XLM-R-large TyDI | 68.8 | 66.8 | 68.4 |
| XLM-R-base NQ | 54.6 | 48 | 53.4 |
| XLM-R-large NQ | 56.6 | 53.3 | 56.1 |

PERSISTENT STORAGE 605

MEMORY 602

RAM 604

CACHE 603

COMMUNICATIONS UNIT 607

PROCESSOR(S) 601

610

I/O INTERFACE(S) 606

EXTERNAL DEVICE(S) 608

DISPLAY 609

NEURAL NETWORK INFERENCE QUANTIZATION

BACKGROUND

The present invention relates generally to the field of machine learning, and more particularly to neural network inference quantization.

Neural networks (NNs) are computing systems inspired by biological neural networks. NNs are not simply algorithms, but rather a framework for machine learning algorithms to process complex inputs. Such systems "learn" to perform tasks by considering training examples, generally without being programmed with any task-specific rules. NNs are based on a collection of connected units or nodes called artificial neurons, which loosely model the neurons in a biological brain where each artificial neuron can transmit a signal from one artificial neuron to another. Here, an artificial neuron receives a signal which said artificial neuron can process the signal and, subsequently, transfer the signal to additional artificial neurons. In common NN implementations, a signal at a connection between artificial neurons is a real number, and the output of each artificial neuron is computed by a non-linear function of the sum of the inputs. Artificial neurons and edges, typically, have respective weights that adjust as learning proceeds. The respective weights increase or decrease a strength of a signal at a connection. Artificial neurons may have a threshold such that a signal is only sent if an aggregate signal crosses the threshold. Typically, artificial neurons are aggregated into layers where a plurality of layers perform a plurality of data transformations on inputs.

SUMMARY

Embodiments of the present invention disclose a computer-implemented method, a computer program product, and a system. The computer-implemented method includes one or more computer processers responsive to neural network run-time, reducing one or more sets of maximum activations along a hidden dimension respectively associated with one or more activation tensors and one or more layers of a neural network. The one or more computer processors compute an interquartile range (IQR) clip threshold for each reduced set for each sequence dimension in the neural network. The one or more computer processors clip one or more activations based on respective computed IQR clip thresholds. The one or more computer processors quantize the clipped activations.

BRIEF DESCRIPTION OF THE DRAWINGS

FIG. 1 is a functional block diagram illustrating a computational environment, in accordance with an embodiment of the present invention;

FIG. 3 illustrates exemplary algorithmic steps of the program within the computational environment of FIG. 1, in accordance with an embodiment of the present invention;

DETAILED DESCRIPTION

Figure 2:
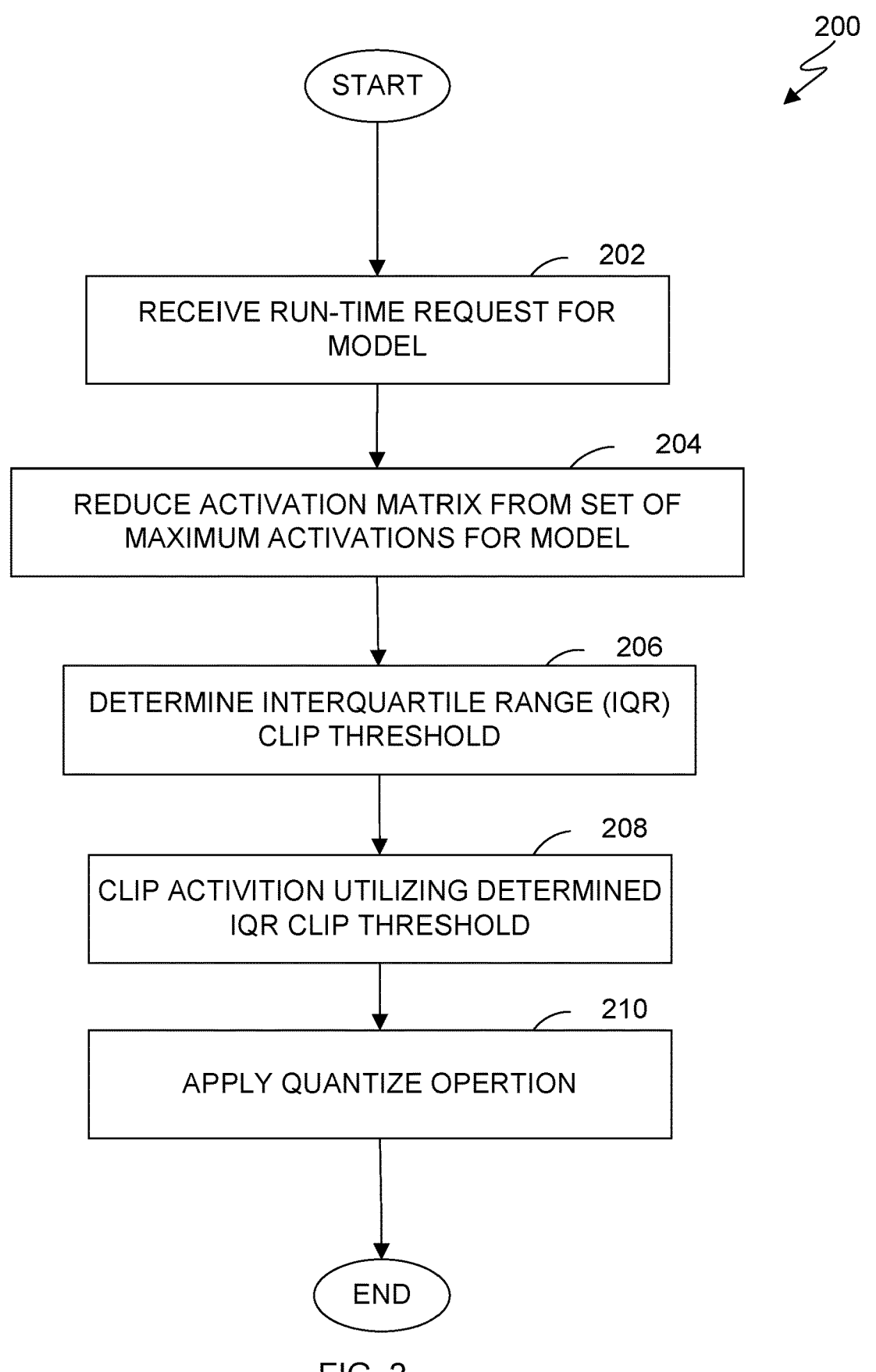
FIG. 2 is a flowchart depicting operational steps of a program, on a server computer within the computational environment of FIG. 1, for neural network quantization with token-maximums interquartile range clipping, in accordance with an embodiment of the present invention.

Transformer-based Neural Networks (NN) such as Bidirectional Encoder Representations from Transformers (BERT), and XLM-R, pre-trained on large amounts of data, have led to state-of-the-art (SOTA) results on many natural language processing (NLP) tasks such as machine translation, text classification, and question answering. However, run-time inference of such large models is very costly due to large computational requirements. In addition, deploying these models on smaller footprint computing devices (e.g., mobile devices) or cost-effective central processing unit (CPU) based machines require aggressive optimization techniques for both speed and network size. One popular optimization technique is NN quantization where network weights and activations are transformed from 32-bit floating-point representations to integers (e.g., 8-bit). Running inference using integer operations has two key advantages. First, the model size footprint is considerably reduced, for example, 8-bit quantization shrinks models by a factor of four. Second, inference throughput is significantly increased by using more efficient integer-based single instruction multiple data (SIMD) instructions while improving memory bandwidth utilization, typically a bottleneck limiting computational throughput. Although, fundamentally, the techniques discussed above lead to a quantitative loss of information due to lowered numerical precision, as a result, applying integer quantization directly to NN models results in a considerable drop in accuracy.

The majority of quantization research involves a mix of quantization-aware training (QAT) and post-training calibration techniques with varying complexities to resolve the quantization performance gap. While these techniques typically close the gap in the quantized model accuracy, said techniques require access to the training pipeline as well as the training data. In addition, these methods are not applicable to models where both training procedures and data are not available. Also, these methods may be affected by training instabilities, increasing the complexity of the training regimes. In addition, post-training approaches require calibration techniques on selected datasets. Special care needs to be taken when selecting a calibration dataset; as it needs to be broad or diverse but yet task specific. In certain cases, run-time input deviations from the calibration dataset leads to low accuracy or unpredictable behavior.

Embodiments of the present invention reduce computational requirements while minimizing model accuracy loss through neural network quantization with selective adjustment of quantization parameters (e.g., clipping thresholds). Embodiments of the present invention reduce accuracy loss associated with quantizing BERT-like models to 8-bit integers. Embodiments of the present invention utilize dynamic Interquartile Range (IQR) to clip the activations dynamically during inference time, wherein the IQR is a measure of statistical dispersion. Embodiments of the present invention do not require any modification to the training procedure nor additional calibration steps to adjust parameters as present in previous methods. Embodiments of the present invention ensure that at least 75% of token-wise extreme activations are not modified, while leaving the remaining 25% to be statistically modified as outliers, leading to a robust model while improving quantization accuracy. Embodiments of the present invention recognize that BERT-like models can be quantized to 8-bit integers with good accuracy without the need for modification of training procedures or extraneous datasets for parameter calibration. Embodiments of the present invention present a robust statistical based algorithm that dynamically adjusts the quantization clipping to maintain reasonable accuracy. Embodiments of the present invention empirically demonstrate robust effectiveness on a number of NLP monolingual and multilingual tasks, trained on BERT-like models. Embodiments of the present invention enable cost-effective deployment of pretrained neural net models while reducing model size footprint (e.g., up to four times reduction with 8-bit quantization). Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes program 150. In other embodiments, server computer 120 may contain other applications, databases, programs, etc. which have not been depicted in computational environment 100. Server computer 120 may include internal and external hardware components, as depicted and described in further detail with respect to FIG. 6.

Program 150 is a program for neural network quantization with token-maximums interquartile range (TM-IQR) clipping. Program 150 provides a "ready-to-use" inference time dynamic quantization method that does not require sophisticated retraining, finetuning, and additional calibration strategies. In an embodiment, program 150 supports monolingual and multilingual transformer architectures without additional calibration. In various embodiments, program 150 may implement the following steps: responsive to neural network run-time, reduce one or more sets of maximum activations along a hidden dimension respectively associated with one or more activation tensors and one or more layers of a neural network; compute an interquartile range (IQR) clip threshold for each reduced set for each sequence dimension in the neural network; clip one or more activations based on respective computed IQR clip thresholds; and quantize the clipped activations. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes model 152. Program 150 is depicted and described in further detail with respect to FIG. 2.

Model 152 is representative of a model utilizing deep learning techniques to train, calculate weights, ingest inputs, and output a plurality of solution vectors. In an embodiment, model 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 152 is a deep learning model in which every output element is connected to every input element, and the weightings between them are dynamically calculated based upon their connection, in other words, BERT-like. In this embodiment, model 152 is capable of sequence-to-sequence based language generation tasks such as question answering, abstract summarization, sentence prediction, conversational response generation, and natural language understanding tasks (e.g., polysemy and coreference resolution, word sense disambiguation, natural language inference, and sentiment classification). Model 152 is depicted and described in further detail with respect to FIG. 2.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

FIG. 2 depicts flowchart 200 illustrating operational steps of program 150 for neural network quantization with token-maximums interquartile range (TM-IQR) clipping, in accordance with an embodiment of the present invention.

Program 150 receives run-time request for a model (step 202). In an embodiment, program 150 initiates responsive to detection or reception of trained model 152. In another embodiment, program 150 initiates responsive to a quantization request for trained model 152. In yet another embodiment, program 150 initiates responsive to an execution request for trained model 152. For example, program 150 monitors execution or run-time requests for model 152, pretrained for NLP tasks, to one or more users, applications, or systems for subsequent computations. In various embodiments, program 150 quantizes model weights at load-time and dynamically quantizes activations at run-time.

Program 150 reduces an activation matrix from a set of maximum activations for the model (step 204). In an embodiment, program 150 identifies, assembles, and/or collects one or more sets containing maximum activations associated with a tensor and one or more hidden layers. In an embodiment, the activation tensor is represented as $A \in \mathbb{R}^{L \times H}$ with $\mathcal{L} \leftarrow \{1, 2, \ldots, L\}$ and $\mathcal{H} \leftarrow \{1, 2, \ldots, H\}$, wherein L is the sequence length and H is the hidden dimension. In various embodiments, to lower run-time, program 150 obtains the IQR clipping threshold, as described in step 206, from a reduced set formed by collecting the maximum activations, in absolute sense, along the H dimension. In the above embodiments, program 150 composes the set of token-maximum activations utilizing the following procedure: $M(i) \leftarrow {}^{max}\forall_{j \in \mathcal{H}} |A(i,j)|, \forall i \in \mathcal{L}$, as depicted in FIG. 3.

Program 150 determines interquartile range (IQR) clip threshold (step 206). In an embodiment, program 150 dynamically computes an IQR clip threshold for each reduced activation matrix for each sequence dimension and/or layer associated with the model. In an embodiment, program 150 applies row-sorting based on row-based maximum activations as reduced in step 204. In the above embodiments, program 150 sorts and partitions said reduced activation matrices. In this embodiment, program 150 computes said matrices into two values as represented in FIG. 3, specifically $q1 \leftarrow$ first-quartile(M) and $q3 \leftarrow$ third-quartile (M). In an embodiment, program 150 calculates the inter-quartile IQR clip threshold utilizing the following procedure $t \leftarrow q3 + 1.5(q3 - q1)$, where q3 is the third quartile (e.g., median of 75% of row-wise outlier activations) and q1 is the first quartile (e.g., 25%).

Program 150 clips an activation tensor utilizing determined IQR clip threshold (step 208). In an embodiment, program 150 utilizes the determined IQR threshold to clip activations respectively associated with each layer in the model. In an embodiment, program 150 clips an activation tensor utilizing the following two procedures $A(i,j) \leftarrow \min(A(i,j),t), \forall(i,j) \in \mathcal{L} \times \mathcal{H}$ and $A(i,j) \leftarrow \max(A(i,j), -t), \forall(i,j) \in \mathcal{L} \times \mathcal{H}$. In an embodiment, program 150 utilizes the IQR clip threshold to isolate outlier values and rows of an activation matrix into a plurality of quantized partitions. In a further embodiment, program 150 computes the outlier rows in quantized partitions utilizing factored matrix-multiplication. In this embodiment, program 150 utilizes separate 8-bit quantization for each partition whereby improving model accuracy by reducing sensitivity of quantization scale to conform with outlier values while minimally affecting model speed. In an embodiment, program 150 utilizes higher precision to compute the partitions, such as 18-bit or 32-bit floating-point (FP). The resulting complexity of the IQR clipping becomes O(N+L log L).

Program 150 applies a quantize operation (step 210). Responsive to one or more clipped activation tensors, program 150 applies one or more quantization operations to said activation tensors. For example, program 150 applies optimized 8-bit integer quantized inference (18). In an embodiment, responsive to quantization, program 150 performs GEMM operations allowing the use of fast SIMD instruction sets. In a further embodiment, program 150 applies the TM-IQR clipping procedure, described above, before each quantized GEMM operation. In a further embodiment, program 150 applies TM-IQR clipping to the input activations of a second feed-forward (FF2) GEMM operation. In an embodiment, program 150 tunes method parameters using accuracy scores on a preselected in-domain labeled datasets. In another embodiment, program 150 tunes method parameters utilizing forward computations of unlabeled data. In yet another embodiment, program 150 utilizes the determined IQR threshold to minimize difference between quantized and unquantized matrix-multiplication outputs. In an embodiment, responsive to complete quantization of a model, program 150 initiates one or more NLP task or processes utilizing the quantized model.

Further Comments and/or Embodiments

Transformer-based Neural Networks (NN) such as BERT, and XLM-R, pre-trained on large amounts of data, have led to state-of-the-art (SOTA) results on many NLP tasks such as machine translation, text classification, and question answering. However, run-time inference of such large models is very costly due to their large computational requirements. In addition, deploying these models on smaller footprint mobile devices or cost-effective CPU based machines require aggressive optimization techniques for both speed and network size. One popular technique is NN quantization where network weights and activations are transformed from 32-bit floating-point representations to integers (typically 8-bit). Running inference using integer operations has two key advantages. First, the model size footprint is considerably reduced e.g., 8-bit quantization shrinks models by a factor of four. Second, inference throughput is significantly increased by using more efficient integer-based "single instruction multiple data" (SIMD) instructions while improving memory bandwidth utilization, which is typically a bottleneck limiting computational throughput for NNs.

Fundamentally, quantization leads to a quantitative loss of information due to the lowered numerical precision. As a result, applying integer quantization directly to NN models leads to considerable drop in accuracy. However, by carefully adjusting the quantization parameters such as the clipping thresholds, the accuracy loss can be significantly reduced, if not eliminated.

The majority of quantization research involves a mix of quantization-aware training (QAT) and post-training calibration techniques with varying complexities to resolve the quantization performance gap. In detail techniques for QAT as well as approaches where the quantization parameters are optimized using statistics gathered during training. While these approaches typically close the gap in the quantized model accuracy, said approaches require access to the training pipeline as well as the training data. In addition, these methods are not applicable to models where both training procedures and data are not available. Also, these methods may be affected by training instabilities, increasing the complexity of the training regimes. Post-training approaches such require calibration techniques on selected datasets. For example, in Kullback-Leibler (KL)-divergence between the unquantized and quantized activations on each layer was used to tune the quantization clipping thresholds. Special care needs to be taken when selecting a calibration dataset; as it needs to be diverse enough but yet task specific. In certain cases, this leads to low accuracy, or even unpredictable behavior, if the run-time input deviates from the calibration dataset.

Two methods that assist in eliminating the need for training datasets are implemented with convolutional neural network (CNN)-based networks, and are used for image classification and object detection tasks. The first method reduces the quantization error by rescaling the weights of consecutive CNN layers while taking advantage of the equivariance property of the piece-wise linear Rectified Linear Unit (ReLU) function The second method, on the other hand, tunes the quantization parameters using synthetic data generated utilizing mean and variance statistics obtained from the batch normalization layers of the model itself. While both methods are applicable for mainly CNN-based networks, the present algorithm is considerably simpler to implement and targets transformers; particularly SOTA NLP networks with BERT-like pre-trained representations.

The present invention presents a method that utilizes the Interquartile Range (IQR), which is a measure of statistical dispersion, to clip the activations dynamically during inference time. The present invention ensures that at least 75% of the token-wise extreme activations are not modified, while leaving the remaining 25% to be statistically modified as outliers, leading to a robust behavior while considerably improving quantization accuracy. The present invention works for any transformer-based "trained" model and does not require any form of training or calibration. Overall, The present invention can be summarized as follows:

A "ready-to-use" inference time dynamic quantization method that does not require sophisticated re-training/finetuning and additional calibration strategies.

The present invention demonstrates both effectiveness and robustness on several different NLP benchmark tasks.

Further, contrary to prior work, the present invention works both for monolingual and multilingual transformer architectures out-of-the-box.

Existing approaches to speed up inference for transformers mostly focus on General Matrix Multiply (GEMM) operations. Fast GEMM implementations routinely use GPU and CPU specific SIMD instructions, to execute many multiplications and additions in parallel. GEMM implementations also optimize memory access patterns to make the best use of available memory bandwidth. Integer quantization speeds up the GEMM operations by increasing the amount of data transferred with each memory transaction Integer quantization also take advantage of denser SIMD instructions. For example, 8-bit quantization packs four times the data per memory transaction compared to 32-bit floating point values. Many CPUs also support 8 bit SIMD multiplication operations, providing faster as well as cost-effective computation.

Dynamic quantization for inference quantizes activations at run time. The model weights are typically quantized once ahead of execution. Let $\mathcal{M} \in \mathbb{R}^{m \times n}$ be a matrix of either an activation or parameter weights. The quantization scale (QS) is obtained as:

$$QS = \max_{\substack{\forall i \in \{1, \ldots, m\} \\ \forall j \in \{1, \ldots, n\}}} |\mathcal{M}(i, j)|. \qquad 1)$$

The matrix $\mathcal{M}$ is then quantized to $\overline{\mathcal{M}} \in \mathbb{Z}^{m \times n}$ as follows:

$$\overline{\mathcal{M}} = \mathrm{int}\left(\frac{2^b/2 - 1}{QS} \mathcal{M}\right), \qquad 2)$$

where b is the number of bits (e.g., 8 bits) and the function int is the element-wise integer conversion operator (e.g., a floor function). The reason for the subtraction by 1 in (2) is to ensure that the quantization range is equally spread around zero. In the case of 8-bits, the range becomes 127. This formulation also results in a symmetric form of uniform quantization, where the quantization is evenly split around zero. This can be modified by adding a zero-shift resulting in an asymmetric quantization, which may particularly be useful for certain activation functions such as ReLU and GELU. While non-uniform quantization has been explored to better capture weight and activation distribution with variable step sizes, uniform quantization leads to more efficient implementation on current hardware such as GPUs and CPUs with acceptable accuracy. Once matrices are quantized, GEMM operations are performed using integer arithmetic allowing the use of fast SIMD instruction sets.

Quantization lowers numerical precision which leads to loss of information. Examining equation (1) shows how the QS can increase precision errors if it takes extreme values that largely deviate from the majority activations. Therefore, the activation tensor must be clipped to reduce the quantization error; however, excessive clipping can lead to distortions in the activation which also leads to drops in accuracy.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data can be stored in persistent storage 605 for access and/or execution by one or more of the respective processors 601 via cache 603.

If we consider the extreme values in the activations as outliers in a distribution, there is a substantial amount of research for identifying. The present invention makes use of a low complexity univariate statistical based method for outlier detection referred to as the Interquartile Range (IQR) method. IQR is also considered a robust statistical measure of the data spread, with the notion of robustness being defined using the concept of a breakdown point. The breakdown point is the minimum number of data that can be arbitrarily replaced while keeping the statistical measure bounded. The sample mean and variance has a 0 breakdown point, leaving these measures to be susceptible to any outliers; on the other hand, the IQR has a 25% breakdown point.

The present invention introduces an algorithm that uses IQR to efficiently eliminate outliers from an activation tensor. It is worth noting that a direct implementation of the IQR method is too slow as it uses a sorting operation in order to identify the quartiles. The complexity of a naive implementation would be O(N log N) where N is the number of elements of the activation tensor. In the case of BERT-like models, N=L×H, where L is the sequence length and H is the hidden dimension; e.g., for BERT-Large, N=5121024. To lower this complexity, the present invention obtains the IQR clipping threshold from a reduced set formed by taking the maximums, in absolute sense, along the H dimension. The present invention will refer to this algorithm as the Token-Maximums IQR (TM-IQR) clipping. The resulting complexity of the IQR clipping becomes O(N+L log L). The present invention shows that adding this form of IQR clipping slows inference only by 2%, which is negligible considering the resulting accuracy gains.

FIG. 3 outlines the basic procedure of TM-IQR clipping. Initially, the present invention composes the set of token-maximum activations in the absolute sense. Essentially, the present invention reduces the set of activations to a smaller representative set that is guaranteed to contain the top outliers. Lines 2 to 5 compute the IQR threshold t which is then used to clip the activation tensor in lines 6 and 7.

It is important to note here that the TM-IQR algorithm assigns a dynamic clip value for each activation tensor as opposed to using a fixed value for all run-time inference. Unlike fixed clipping tuned by training datasets, the present invention expects TM-IQR clipping to be applied in a zero-shot approach across multiple tasks while maintaining reasonable empirical accuracy. This is due to the fact that clipping strategy of the present invention guarantees that at least 75% of the row-wise extreme activations are not impacted by it, while a fixed clipping method does not offer such guarantees for all types of input, as the case when the input is not very aligned with training data. This has the important effect of limiting the distortion error, which occurs when quantizing activations with excessive clipping.

The run-time inference engine of the present invention, implemented in C++, supports both FP32 and an optimized 8-bit integer quantized inference (I8). The present invention's quantize model weights at load-time and dynamically quantize activations at run-time. The TM-IQR technique is a straightforward modification with a small speed impact on the overall inference, up to 2%. For a speed comparison between CPU and GPU, the present invention run the quantized engine on 48 cores of a CPU. Each core handles one input at a time. The throughput is about 33% of the speed of a modern GPU using a batch size of 128 and input sequences of 512.

The TM-IQR can be applied on the activations before each quantized GEMM operation. However, the present invention revealed that the second feed-forward, henceforth referred to as FF2, GEMM operation contributes to the majority of the quantization error. The input dimensions of FF2 are very wide, 4×H, providing more of a chance for saturation and integer numerical instability to accumulate. In addition, the input to FF2 constitute the activations of either a ReLU or a GELU nonlinearities. The range of such activation functions is unbounded on the positive side, which further increase the chance of saturations. Therefore, the present invention found it most effective to apply the TM-IQR to the input activations of the FF2 GEMM operation.

The present invention was tested on GLUE and 2 popular question answering (QA) tasks: Natural Questions (NQ) and TyDI 1. The present invention trained all tasks using the publicly available training sets. For all tasks, the present invention ran five seeds with default hyper-parameters. The present invention underlying pre-trained language model for GLUE is BERT (cased) and XLMR for QA as they are both mono and multilingual. Note the present invention did not need any fine-tuning once this step is done and models are obtained.

Figure 4:
FIG. 4 is an exemplary table, in accordance with an embodiment of the present invention.

GLUE: FIG. 4 shows that IM-IQR is robust with an overall average score drop by only 0.2% for BERT-base and 0.5% for BERT-large compared to FP32. In fact, on all tasks, TM-IQR is within a small tolerance to FP32. TM-IQR does well for cases where I8 drop is large e.g., CoLA and RTE.

QA: On TyDI and NQ (FIG. 5), TM-IQR clearly recovers most of the performance lost to dynamic quantization and is superior to I8 by 1 point on average. Similar to GLUE, TM-IQR still performs well with the I8 drop being the highest.

The present invention shows that BERT-like models can be quantized to 8-bit integers with good accuracy without the need for modification to training procedures or extra data sets for parameter calibration. The present invention presents a robust statistical based algorithm that dynamically adjusts the quantization clipping to maintain reasonable accuracy. The present invention empirically demonstrates the effectiveness of a number of NLP monolingual and multilingual tasks, trained on different BERT-like models for both sizes base and large.

FIG. 3 depicts exemplary algorithm 300, in accordance with an illustrative embodiment of the present invention. Exemplary algorithm 300 illustrates an algorithm detailing the steps of TM-IQR clipping, as described in the flowchart and steps of FIG. 2.

FIG. 4 illustrates table 400, in accordance with an illustrative embodiment of the present invention. Table 400 contains results from program 150 TM-IQR clipping tested on general language understanding evaluation (GLUE) tasks with three computational modes, 32-bit floating-point (FP32), 8-bit quantization (I8) and TM-IQR (i.e., program 150). Metric values are mean and standard deviation (in parenthesis) over five seeds. Table 400 demonstrates shows that TM-IQR is robust with an overall average score drop by only 0.2% for BERT-base and 0.5% for BERT-large compared to FP32, in fact, on all tasks, TM-IQR is within a small tolerance to FP32.

Figure 5:
FIG. 5 is an exemplary table, in accordance with an embodiment of the present invention.

FIG. 5 illustrates table 500, in accordance with an illustrative embodiment of the present invention. Table 500 contains results from program 150 TM-IQR tested on question answering tasks (i.e., Natural Questions (NQ) and TyDI). On TyDI and NQ, table 500 demonstrates that TM-IQR recovers most of the performance lost to dynamic quantization and is superior to I8 by 1 point on average. Similar to GLUE, TM-IQR still performs well with the I8 drop being the highest.

Figure 6:
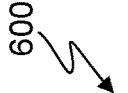
FIG. 6 is a block diagram of components of the server computer, in accordance with an embodiment of the present invention.

FIG. 6 depicts block diagram 600 illustrating components of server computer 120 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server computer 120 each include communications fabric 610, which provides communications between cache 603, memory 602, persistent storage 605, communications unit 607, and input/output (I/O) interface(s) 606. Communications fabric 610 can be implemented with any architecture designed for passing data and/or control information between processors (such as microprocessors, communications, and network processors, etc.), system memory, peripheral devices, and any other hardware components within a system. For example, communications fabric 610 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of computer processor(s) 601 by holding recently accessed data, and data near accessed data, from memory 602.

Program 150 may be stored in persistent storage 605 and in memory 602 for execution by one or more of the respective computer processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 612 can be stored in persistent storage 605 for access and/or execution by one or more of the respective processors 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program 150 may be downloaded to persistent storage 605 through communications unit 607.

I/O interface(s) 606 allows for input and output of data with other devices that may be connected to server computer 120. For example, I/O interface(s) 606 may provide a connection to external device(s) 608, such as a keyboard, a keypad, a touch screen, and/or some other suitable input device. External devices 608 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 605 via I/O interface(s) 606. I/O interface(s) 606 also connect to a display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to neural network inference, reducing, by one or more computer processors, one or more sets of maximum activations along a hidden dimension respectively associated with one or more activation tensors and one or more layers of a quantized neural network;

computing, by one or more computer processors, an interquartile range (IQR) clip threshold for each reduced set for each sequence dimension in the neural network;

clipping, by one or more computer processors, one or more activations based on respective computed IQR clip thresholds into a plurality of quantized partitions; and responsive to a second feed-forward general matrix multiply (GEMM) operation utilizing a single instruction multiple data (SIMD) instruction set, applying, by one or more computer processors, the clipped and quantized activations to one or more input activations of the operation.

2. The computer-implemented method of claim 1, wherein computing IQR clip threshold for each reduced set for each sequence dimension in the neural network, further comprises:
row-sorting, by one or more computer processors, the one or more reduced sets of activation based on row-based maximum activations; and computing, by one or more computer processors, the IQR clip threshold as q3+1.5(q3−q1), wherein q3 is a median value of 75% of row-wise outlier activations and q1 is a median value of 25% of row-wise outlier activations.

3. The computer-implemented method of claim 2, further comprising:
isolating, by one or more computer processors, activation outlier values and rows comprised in an activation matrix into a plurality of partitions utilizing the computed IQR clip threshold, wherein each partition in the plurality of partitions is quantized utilizing separate 8-bit quantization reducing sensitivity of quantization scale conforming with outlier activations.

4. The computer-implemented method of claim 1, further comprising:

initiating, by one or more computer processors, one or more natural language tasks utilizing the quantized neural network.

5. A computer program product comprising:

one or more computer readable storage media and program instructions stored on the one or more computer readable storage media, the stored program instructions comprising:

program instructions to responsive to neural network inference, reduce one or more sets of maximum activations along a hidden dimension respectively associated with one or more activation tensors and one or more layers of a quantized neural network;

program instructions to compute an interquartile range (IQR) clip threshold for each reduced set for each sequence dimension in the neural network;

program instructions to clip one or more activations based on respective computed IQR clip thresholds into a plurality of quantized partitions; and program instructions to, responsive to a second feed-forward general matrix multiply (GEMM) operation utilizing a single instruction multiple data (SIMD) instruction set, apply the clipped and quantized activations to one or more input activations of the operation.

6. The computer program product of claim 5, wherein the program instructions, to compute IQR clip threshold for each reduced set for each sequence dimension in the neural network, comprise:

program instructions to row-sort the one or more reduced sets of activation based on row-based maximum activations; and program instructions to compute the IQR clip threshold as $q3+1.5(q3-q1)$, wherein q3 is a median value of 75% of row-wise outlier activations and q1 is a median value of 25% of row-wise outlier activations.

7. The computer program product of claim 6, wherein the program instructions, stored on the one or more computer readable storage media, further comprise:

program instructions to isolate activation outlier values and rows comprised in an activation matrix into a plurality of partitions utilizing the computed IQR clip threshold, wherein each partition in the plurality of partitions is quantized utilizing separate 8-bit quantization reducing sensitivity of quantization scale conforming with outlier activations.

8. The computer program product of claim 5, wherein the program instructions, stored on the one or more computer readable storage media, further comprise:

program instructions to initiate one or more natural language tasks utilizing the quantized neural network.

9. A computer system comprising:

one or more computer processors;

one or more computer readable storage media; and program instructions stored on the computer readable storage media for execution by at least one of the one or more processors, the stored program instructions comprising:

program instructions to responsive to neural network inference, reduce one or more sets of maximum activations along a hidden dimension respectively associated with one or more activation tensors and one or more layers of a quantized neural network;

program instructions to compute an interquartile range (IQR) clip threshold for each reduced set for each sequence dimension in the neural network;

program instructions to clip one or more activations based on respective computed IQR clip thresholds into a plurality of quantized partitions; and program instructions to, responsive to a second feed-forward general matrix multiply (GEMM) operation utilizing a single instruction multiple data (SIMD) instruction set, apply the clipped and quantized activations to one or more input activations of the operation.

10. The computer system of claim 9, wherein the program instructions, to compute IQR clip threshold for each reduced set for each sequence dimension in the neural network, comprise:

program instructions to row-sort the one or more reduced sets of activation based on row-based maximum activations; and program instructions to compute the IQR clip threshold as $q3+1.5(q3-q1)$, wherein q3 is a median value of 75% of row-wise outlier activations and q1 is a median value of 25% of row-wise outlier activations.

11. The computer system of claim 10, wherein the program instructions, stored on the one or more computer readable storage media, further comprise:

program instructions to isolate activation outlier values and rows comprised in an activation matrix into a plurality of partitions utilizing the computed IQR clip threshold, wherein each partition in the plurality of partitions is quantized utilizing separate 8-bit quantization reducing sensitivity of quantization scale conforming with outlier activations.

\* \* \* \* \*